United States Patent [19]

Kozlinski

[11] Patent Number: 4,904,009
[45] Date of Patent: Feb. 27, 1990

[54] FOOD HANDLING TONGS

[76] Inventor: Kent W. Kozlinski, Box 71, Cadogan, Alberta, Canada, T0B 0T0

[21] Appl. No.: 251,242

[22] Filed: Sep. 30, 1988

[51] Int. Cl.$^4$ ............................................. A47J 43/28
[52] U.S. Cl. ........................................... 294/7; 99/394; 100/234; 294/118; 294/902
[58] Field of Search ................. 294/7, 8, 8.5, 11, 16, 294/25, 26.5, 28, 106, 118, 902; 99/380, 394, 400, 402, 425–427, 444, 450; 100/110, 116, 213, 234

[56] References Cited

U.S. PATENT DOCUMENTS

| | | | |
|---|---|---|---|
| 911,823 | 2/1909 | Krieger | 294/25 |
| 1,005,590 | 10/1911 | Bond et al. | 294/106 X |
| 2,801,877 | 8/1957 | Hetrick | 294/106 |
| 2,881,022 | 4/1959 | Brust | 294/25 |
| 2,887,948 | 5/1959 | Kramer et al. | 100/213 |
| 2,891,814 | 6/1959 | Idoine et al. | 294/106 X |
| 2,961,683 | 11/1963 | Meyer | 294/118 X |
| 3,964,775 | 6/1976 | Boyd | 294/118 X |
| 4,002,365 | 1/1977 | Rader | 294/8 |
| 4,060,569 | 8/1986 | Dunn et al. | 294/118 |
| 4,355,574 | 10/1982 | Bond et al. | 294/118 X |
| 4,577,900 | 3/1986 | Chasen | 294/118 |

FOREIGN PATENT DOCUMENTS 491615 3/1953 Canada ............................ 294/7

Primary Examiner—Johnny D. Cherry
Attorney, Agent, or Firm—Jerry T. Kearns

[57] ABSTRACT

Food handling tongs include opposed upper and lower plates mounted for pivotal movement between opened and closed positions. The upper plate is provided with a plurality of circular apertures surrounded by upwardly facing frusto conical portions. The lower plate is provided with a plurality of similar apertures, each surrounded by downwardly facing frusto conical portions. In use, a grease or fat containing food, such as a hamburger patty, is pressed between the upper and lower plates, causing the fat and grease to be squeezed out of the food and be directed out through the apertures in the upper and lower plates. This reduces the fat contents of the food, providing a healthier diet. A pair of drip pan attachments may optionally be utilized with the upper and lower plates to collect the extracted fat and grease.

5 Claims, 4 Drawing Sheets

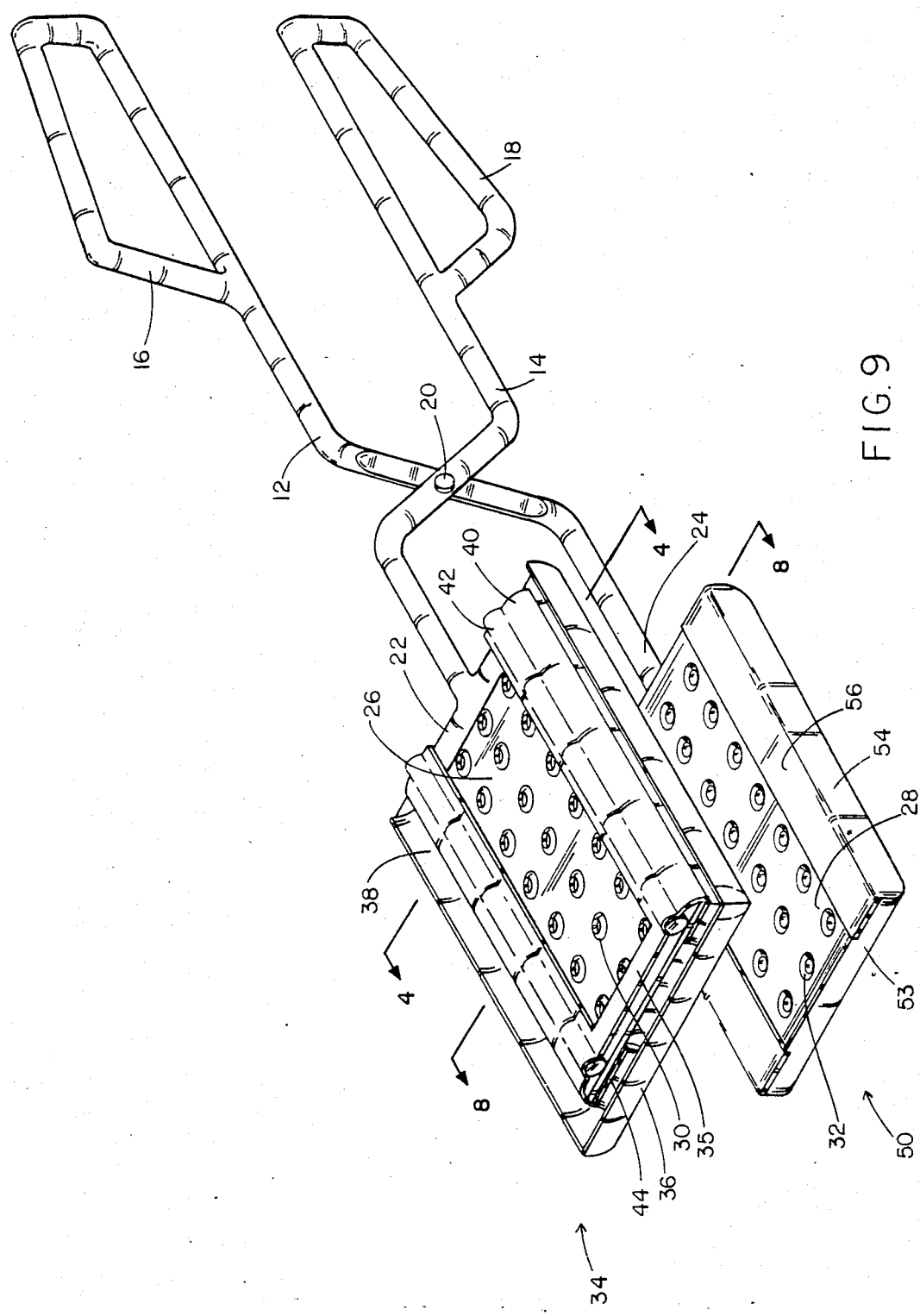

FOOD HANDLING TONGS

BACKGROUND OF THE INVENTION

1. Field of the Invention

The present invention relates to tongs, and more particularly pertains to food handling tongs configured to facilitate removal of excess fats from food items. Many forms of food, and especially fried foods such as hamburger patties, include a large quantity of saturated fats. Medical studies have repeatedly shown that heart disease and cancer are linked to high fat and cholesterol diets. In order to eliminate excess fats from fried foods, the present invention provides food handling tongs specifically constructed to squeeze excess fats and grease from food items.

2. Description of the Prior Art

Various types of tongs are known in the prior art. A typical example of such a tong device is to be found in U.S. Pat. No. 2,961,683, which issued to F. Meyer on Nov. 29, 1963. This patent discloses a pair of tongs for squeezing paint from paint rollers. U.S. Pat. No. 3,964,775, which issued to L. Boyd on Jun. 22, 1976, discloses a set of tongs for grasping material which includes a pair of jaws and a pair of handles correspondingly secured to the jaws. The jaws have a plurality of tines with lateral extensions to reduce the space between the tines. In addition, the tines may include inward protrusions to stabilize the material grasp by the tongs. U.S. Pat. No. 4,002,365, which issued to J. Rader on Jan. 11, 1977, discloses tongs for handling food items upon a grill in which the food gripping parts of the tongs are displaced laterally as well as apart when opened to enable the user of the tongs to see the food item as it is being gripped by the tongs. U.S. Pat. No. 4,577,900, which issued to L. Chasen on Mar. 25, 1986, discloses a pair of self adjusting tongs for grasping food, wherein the jaws are independently rotatable within a limited angular range about corresponding pivot axes, with each jaw being spring loaded by an arcuate spring extension of the jaw, the end of the spring extension constituting a loop which surrounds and slides along the corresponding stem of the tongs. U.S. Pat. No. 4,060,569, which issued to J. Dunn et al on Aug. 19, 1986, discloses a pair of food grasping tongs adapted for handling foods such as spaghetti, beans and other foods which are difficult to handle. The tongs have a ladle bowl at the end of one stem and a spoon at the other end of the other stem. The ladle bowl and spoon have perforated major surfaces for draining purposes.

While the above mentioned devices are suited for their intended usage, none of these devices disclose food handling tongs having opposed upper and lower plates each provided with a plurality of apertures surrounded by oppositely directed frusto conical portions. Additionally, none of the aforesaid devices are suitable for removing excess fats and grease from food items. An additional feature of the present invention, not disclosed by any of the aforesaid prior art patents, is the provision of removable drip pans for food handling tongs for collecting fats and grease squeezed from food items. Inasmuch as the art is relatively crowded with respect to these various types of tongs, it can be appreciated that there is a continuing need for and interest in improvements to such tongs, and in this respect, the present invention addresses this need and interest.

SUMMARY OF THE INVENTION

In view of the foregoing disadvantages inherent in the known types of tongs now present in the prior art, the present invention provides an improved food handling tongs. As such, the general purpose of the present invention, which will be described subsequently in greater detail, is to provide a new and improved food handling tongs which has all the advantages of the prior art tongs and none of the disadvantages.

To attain this, a representative embodiment of the concepts of the present invention is illustrated in the drawings and makes use of food handling tongs which include opposed upper and lower plates mounted for pivotal movement between opened and closed positions. The upper plate is provided with a plurality of circular apertures surrounded by upwardly facing frusto conical portions. The lower plate is provided with a plurality of similar apertures, each surrounded by downwardly facing frusto conical portions. In use, a grease or fat containing food, such as a hamburger patty, is pressed between the upper and lower plates, causing the fat and grease to be squeezed out of the food and be directed through the apertures in the upper and lower plates. This reduces the fat contents of the food, providing a healthier diet. A pair of drip pan attachments may optionally be utilized with the upper and lower plates to collect the extracted fats and grease.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved food handling tongs which have all the advantages of the prior art tongs and none of the disadvantages.

It is another object of the present invention to provide new and improved food handling tongs which may be easily and efficiently manufactured and marketed.

It is a further object of the present invention to provide new and improved food handling tongs which are of a durable and reliable construction.

An even further object of the present invention is to provide new and improved food handling tongs which are susceptible of a low cost of manufacture with regard to both materials and labor, and which accordingly is then susceptible of low prices of sale to the consuming public, thereby making such tongs economically available to the buying public.

Still yet another object of the present invention is to provide new and improved food handling tongs which provide in the apparatuses and methods of the prior art some of the advantages thereof, While simultaneously overcoming some of the disadvantages normally associated therewith.

Still another object of the present invention is to provide new and improved food handling tongs specifically adapted to remove excess fats and grease from food items.

Yet another object of the present invention is to provide new and improved food handling tongs having opposed plates each provided with a plurality of apertures, with each aperture surrounded by an outwardly extending frusto conical portion.

Even still another object of the present invention is to provide a new and improved food handling tong for removing and collecting excess fats and grease from food items.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein

FIG. 9 is a perspective view of the tongs of the present invention, with the upper and lower drip pan attachments mounted on the upper and lower food contact plates.

DESCRIPTION OF THE PREFERRED EMBODIMENT

Figure 1:
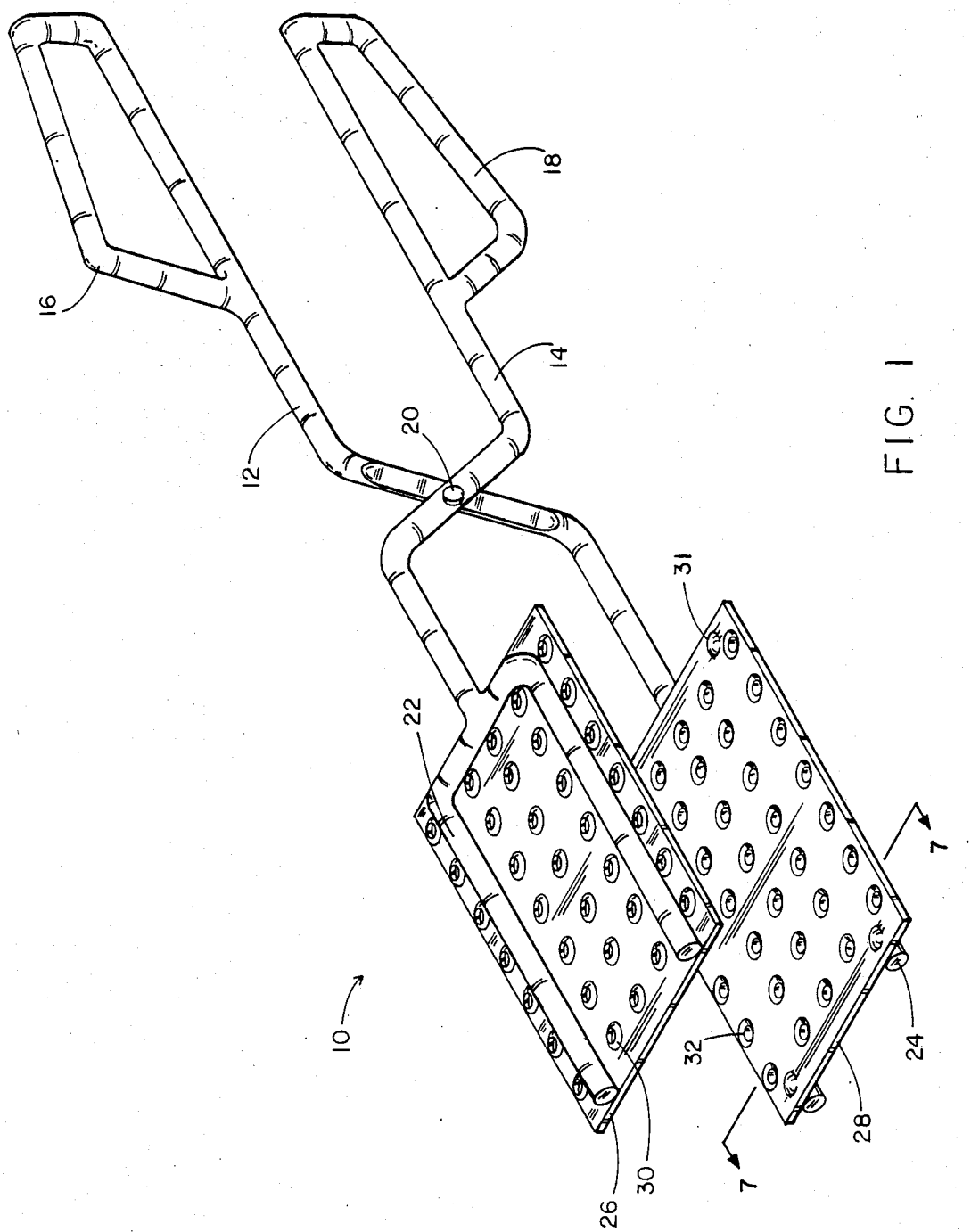
FIG. 1 is a perspective view of the food handling tongs of the present invention.

With reference now to the drawings, and in particular to FIG. 1 thereof, a new and improved food handling tongs embodying the principles and concepts of the present invention and generally designated by the reference numeral 10 will be described.

More specifically, it will be noted that the first embodiment 10 of the invention includes a conventionally formed pair of tong stem portions 12 and 14 provided with respective handle portions 16 and 18. The tong stems 12 and 14 are pivotally connected at 20 in a conventional fashion. The tong stems 12 and 14 are provided with respective bifurcated end portions 24 and 22 which provide mounting surfaces for food contact plates 28 and 26. The upper food contact plate 26 is provided with a plurality of generally circular punched out apertures 30. The punching process forms a frusto conical rim which faces upwardly as illustrated in FIG. 1. The frusto conical rim surrounding each of the apertures 30 prevents grease which has accumulated on the upper surface of the plate 26 from flowing downwardly through the apertures. The lower food contact plate 28 is provided with a plurality of similar apertures 32, With the frusto conical rim portions formed on the bottom surface of the plate 28. As may now be understood, a food item such as a hamburger patty may be received between the plates 26 and 28 and pressed by squeezing handles 16 and 18 together. This pressing action causes excess fats and grease to be pressed from the food item and removed through apertures 30 and 32. The lower food contact plate 28 is provided with a plurality of hemispherical upwardly facing projections 31 for a purpose to be subsequently described.

Figure 2:
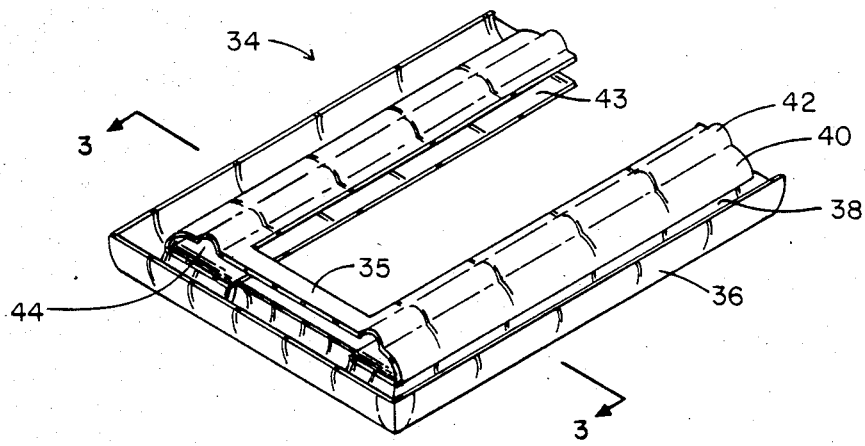
FIG. 2 is a perspective view illustrating the drip pan attachment for the upper food contact plate.

FIG. 2 provides a perspective view which illustrates a drip pan attachment for the upper food contact plate 26. The drip pan attachment 34 is adapted to accumulate fat and grease which has been squeezed from a food item. The upper drip pan attachment 34 has a three sided rectangular channel configuration with an outer side wall 36 and a spaced inner side wall 40 forming a trough 38. A pair of parallel semi-cylindrical tube portions 42 are formed adjacent the inner side walls 40 and are adapted to receive the bifurcated end portion 22 of the tongs. The upper food contact plate 26 is inserted within a slotted portion 44 formed between the semi-cylindrical tubes 42 and retaining flanges 43. A connecting strut 35 extends transversely between end portions of the tubes 42.

Figure 3:
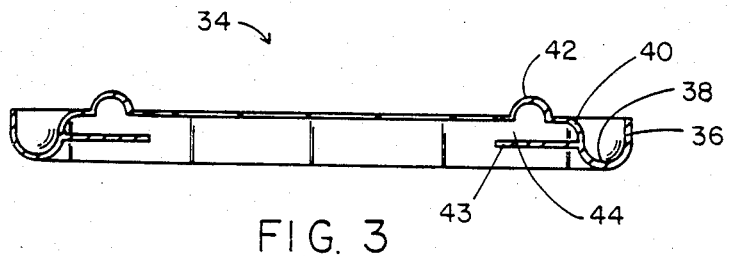
FIG. 3 is a transverse cross sectional view, taken along line 3—3 of FIG. 2, illustrating the constructional details of the upper drip pan attachment.

FIG. 3 provides a transverse cross sectional view which further illustrates the constructional details of the upper drip pan attachment 34.

Figure 4:
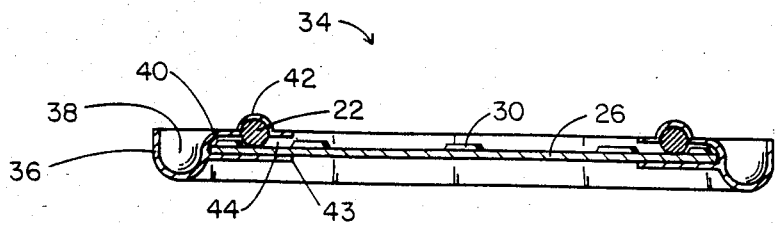
FIG. 4 is a cross sectional view illustrating the upper drip pan attachment mounted on the upper food contact plate.

FIG. 4 provides a transverse cross sectional view which illustrates the upper drip pan attachment 34 mounted on the upper food contact plate 26. The bifurcated end portion 22 of the tongs is illustrated received in the tubes 42, with the side edges of the upper food contact plate 26 received in the slotted portion 44 formed between the tubes 42 and the flanges 43. As may easily be understood with reference to FIG. 4, fat and grease squeezed upwardly through apertures 30 are prevented from returning to the food item by the surrounding upwardly extending frusto conical rim.

Figure 5:
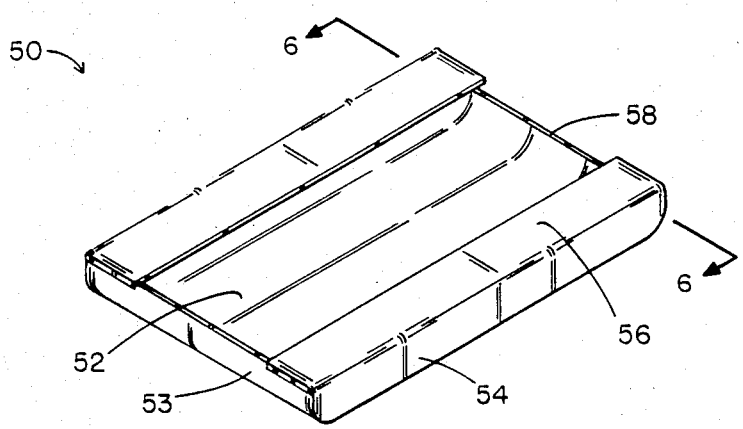
FIG. 5 is a perspective view illustrating the lower food contact plate drip pan attachment.

FIG. 5 provides a perspective illustration of a lower drip pan attachment. The lower drip pan attachment 50 is formed as a shallow, open topped rectangular box having a floor 52, opposed end walls 53 and 58 and side walls 54. A pair of overlying flanges 56 extend along longitudinal side edges of the drip pan attachment 50.

Figure 6:
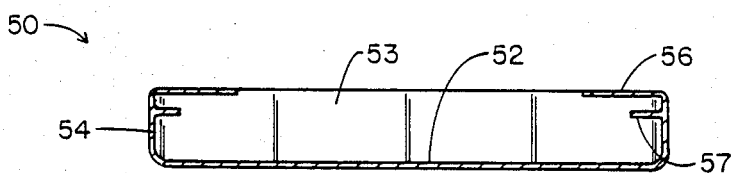
FIG. 6 is a cross sectional view, taken along line 6—6 of FIG. 5, illustrating the constructional details of the lower plate drip pan attachment.

As shown in FIG. 6, an interior flange 57 extends in parallel spaced relation with each of the flanges 56, forming a slotted portion for reception of the lower food contact plate 28 side edges.

Figure 7:
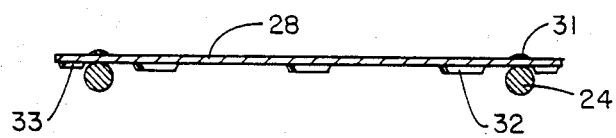
FIG. 7 is a cross sectional view illustrating the lower food contact plate.

FIG. 7 provides a transverse cross sectional illustration of the lower food contact plate 28. As previously described, the apertures 32 are punched downwardly in the plate 28 so as to form a downwardly extending frusto conical rim around each of the apertures. Four hemispherical projections 31 are formed on the upper surface of the plate 28, as illustrated in FIG. 1. Additionally, locating projections 33 may be formed on corner portions on the bottom surface of the plate 28.

Figure 8:
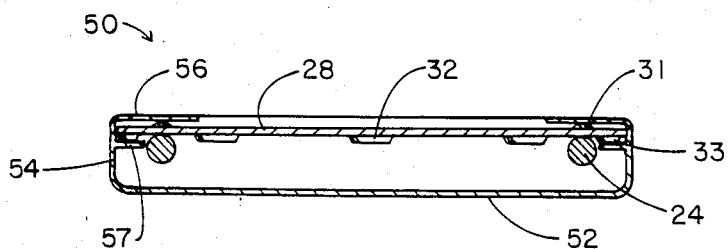
FIG. 8 is a cross sectional view illustrating the lower drip pan attachment mounted on the lower food contact plate.

FIG. 8 provides a cross sectional view which illustrates the lower food contact plate 28 inserted within the slot formed between the flanges 56 and 57 of the lower drip pan attachment 50. As may now be understood, fats and grease squeezed from a food item will flow downwardly through the apertures 32 onto the interior floor portion 52 of the lower drip pan attachment 50.

FIG. 9 provides a perspective illustration of the tongs, with both the upper and lower drip pan attachments mounted. It is to be understood that the tongs of the present invention may be utilized either with or without the drip pan attachments. The attachments are useful when cooking indoors, to prevent collected grease from returning to a cooking pan. If utilizing the tongs for outdoor barbecues, the drip pan attachments may be removed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Food handling tongs, comprising:
   a pair of pivotally connected stem members;
   a handle portion adjacent a first end of each of said stem members;
   a food contact plate attached adjacent a second end of each of said stem members;
   said food contact plates movable between opened and closed positions by manual manipulation of said handle portions;
   each of said food contact plates provided with a plurality of apertures, each of said apertures surrounded by an outwardly facing frusto conical rim;
   and a selectively removable drip pan attachment on each of said food contact plates.

2. The food handling tongs of claim 1, wherein each of said stem members has a bifurcated second end portion secured on a back surface of one of said food contact plates.

3. The food handling tongs of claim 2, wherein said food contact plates comprise an upper plate and a lower plate;
   an upper drip pan attachment having an open, three sided rectangular channel configuration with a peripheral upwardly opening trough;
   and a pair of spaced parallel semicylindrical tubes secured on an upper surface of said upper drip pan attachment, said tubes removably receiving said bifurcated stem end portion secured to said upper contact plate.

4. The food handling tongs of claim 1, wherein said food contact plates comprise an upper plate and a lower plate;
   a lower drip pan attachment formed as a shallow rectangular box having an open top with overlying parallel flanges extending along opposed side edges of said box;
   an interior flange extending within said box in spaced parallel relation beneath each of said overlying flanges, forming opposed parallel slots;
   and said lower food contact plate having parallel longitudinal side edges removably received in said parallel slots.

5. The food handling tongs of claim 4, further comprising a plurality of locating projections on upper and lower surfaces of said lower food contact plate adapted for engagement with said overlying and interior flanges.

* * * * *